United States Patent [19]
Matsuura

[11] 3,939,535
[45] Feb. 24, 1976

[54] TUBE FASTENER

[76] Inventor: Norio Matsuura, 4-12 Nishishoji 4-chome, Minou, Osaka, Japan

[22] Filed: Mar. 18, 1975

[21] Appl. No.: 559,538

[30] Foreign Application Priority Data
Nov. 30, 1974 Japan.............................. 49-137871

[52] U.S. Cl. ................................................ 24/283
[51] Int. Cl.² ......................................... B65D 63/06
[58] Field of Search............ 24/20 LS, 19, 278, 280, 24/281, 283, 27, 28, 279

[56] References Cited
UNITED STATES PATENTS
| 2,349,809 | 5/1944 | Black .................................. 24/283 |
| 3,694,869 | 10/1972 | Matsuura ............................. 24/278 |

FOREIGN PATENTS OR APPLICATIONS
| 453,957 | 9/1936 | United Kingdom................... 24/279 |

*Primary Examiner*—Donald A. Griffin
*Attorney, Agent, or Firm*—Armstrong, Nikaido & Wegner

[57] ABSTRACT

A tube fastener, with a binding wire, both ends of which are made of a spring steel wire and which is wound in coil form, with the ends in crossed relation to one another, such that one end of the binding wire is bent transversely and attached to a supporting plate, and the other end of the binding wire is fixed to a pressing plate and where a screw spindle is fitted to the pressing plate by passing through it, and at the same time, the extreme end of the screwed spindle penetrates the supporting plate and is restrained by one end of the wire, where the wire is being retained by the supporting plate in such a way that the extreme end of the spindle may make free revolutions, with a pressing piece projected on the pressing plate, the extreme end of which is set in a manner such as to press the surface of a tube, and by the revolutionary operation of the screw spindle, the supporting plate and the pressing plate are brought close together and separated alternately, thereby tightening and loosening the steel wire and because of the fact that the pressing plate is capable of tightening the binding effect of the steel wire to a stronger degree due to its reaction force.

6 Claims, 3 Drawing Figures

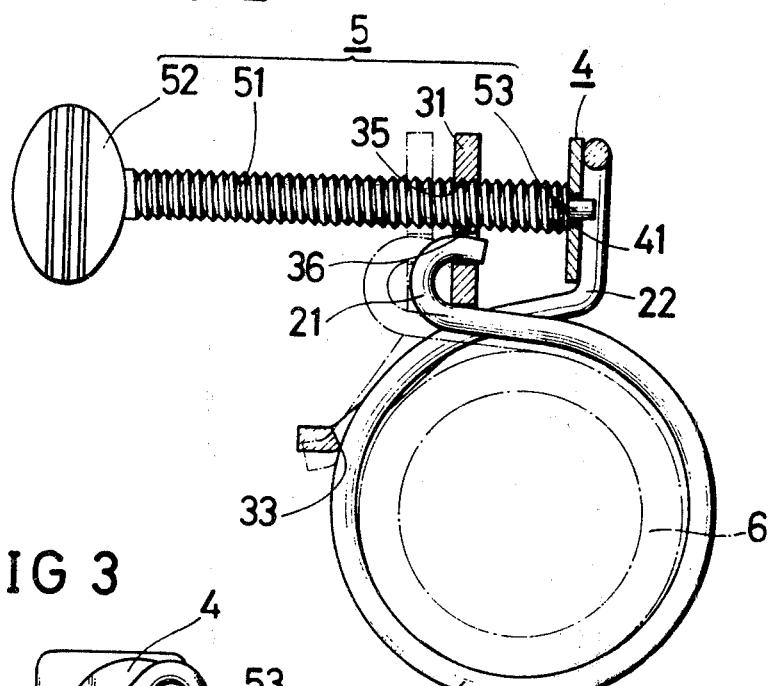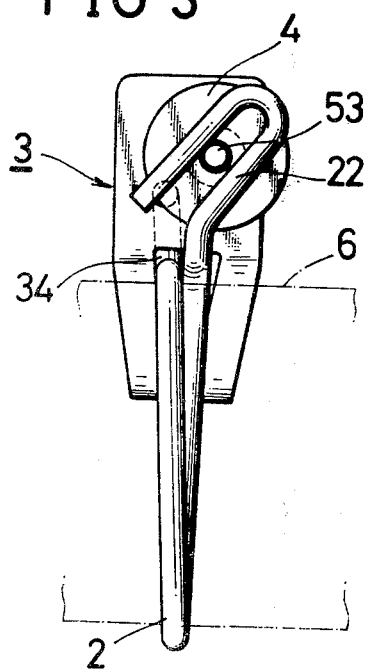

TUBE FASTENER

BACKGROUND OF THE INVENTION

The present invention refers to a binding device for prevention of the disconnection of a rubber hose or the like which is fitted to a gas piping or for fixing a hose in a pressure fluid system.

Hitherto, many binding instruments of various kinds have been in existence, but their structures have all been complicated and required a great multiplicity of parts to construct. For these reasons, those binding instruments involved a disadvantage due to high costs.

The inventor of the present device was granted U.S. Pat. No. 3,694,869 for his former invention of a tube fastener, in which a spring steel wire was wound in a coil form, both ends of which were fixed to each end of a supporting plate, and a screw spindle was fixed by screwing to the center of the supporting plate, penetrating therethrough, thus causing the upper surface of the spring coils to move vertically. Although this fastener exerted an excellent function in binding the tube strongly, it involved many processes in its production, thereby increasing the manufacturing cost of the fasteners to a great disadvantage.

The tube fastener according to the present invention is capable of producing a strong binding function on the tube by its simple structure, and at the same time, it is possible to manufacture and supply the products at low cost. This invention will solve the problems of the tube fasteners with respect to their defect related high manufacturing costs.

SUMMARY OF THE INVENTION

A fastener made in accordance with the present invention is constructed with four parts; namely, the binding wire which is wound in a coil form, the supporting plate and the pressing plate which are to restrain the respective ends of the said binding wire, and the screw spindle which is fixed by screwing to the pressing plate and penetrating through it, the extreme end of which is supported by the supporting plate in such a way that it may revolve freely with the other end having a turning means. The ends of the binding wire are crossed in relation to each other and their extreme ends are restrained by the supporting plate and the pressing plate respectively, the space between the supporting plate and the pressing plate may be changed freely by the revolution of the screwed spindle. Thus, it is possible to tighten or loosen the binding wire. As the pressing plate suppresses the surface of the tube by its projected pressing piece, the pressure-applied point of the tube may work as a fulcrum. Consequently, when the screw spindle moves the pressing plate forward and backward, the binding wire will bind the tube strongly due to the lever action produced thereby.

BRIEF DESCRIPTION OF THE DRAWINGS:

FIG. 2 is a cross sectional view of the said binding section which is prepared by cutting along the 11—11 line of FIG. 1, and through the anchoring holes 36,41 of the supporting plate and the pressing plate, respectively, as viewed in the direction marked with an arrow.

FIG. 3 is a side elevational view of FIG. 1.

DETAILED DESCRIPTION OF THE DRAWINGS

Figure 1:
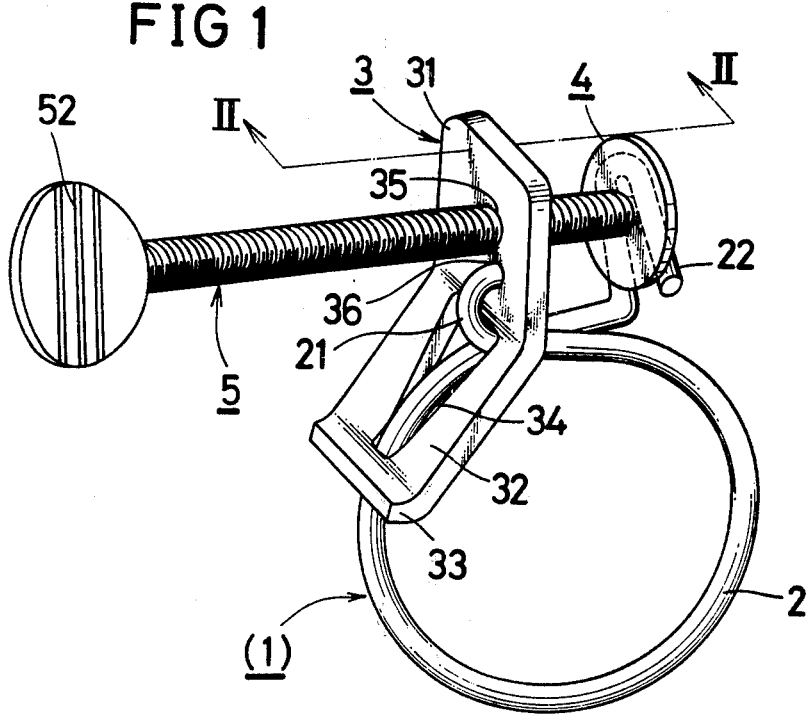
FIG. 1 is an oblique section of the binding device in accordance with the present invention.

The accompanying drawings show an embodiment of this invention, in which the clamping wire 2 of the fastener is formed of a spring steel wire ringed once or more than once. The ends of this wire cross each other at the point of meeting. While one end 21 of the clamping wire is folded back, and anchored to a holding or pressing plate 3, the other end 22 is bent sideways being folded back, to be held in contact with a supporting plate 4 and retained thereby.

The aforementioned holding or pressing plate 3 has a vertical piece 31 at one end, being bent and extended, thereby forming the holding piece 32. The lower end 33 of the holding piece 32 is bent upwardly for avoiding contact with the clamping wire, and a slit 34 is opened along nearly the whole length of the holding piece 32, in such a manner that part of the ringed clamping wire 2 and one wire end 21 may be inserted therethrough. A screw hole 35 is provided in the vertical piece 31. The anchoring hole 36 is opened in a vertically displaced fashion in relation to the said hole 35. The folded-back end 21 of the clamping wire 2 is passed through the slit 34 of the aforementioned holding piece, and is then anchored through the anchoring hole 36.

The aforementioned supporting plate 4 may be in the form of a disc and has a through-hole 41 opened at the center thereof. It is disposed above the clamping wire, facing the aforementioned holding plate 3, and in contact with the folded-back end 22 of the part bent sideways of the clamping wire 2.

The screw spindle shaft 5 is threaded through the hole 35 of the holding or pressing plate 3, and the small diameter part 53 formed at one tip of the screw spindle shaft is inserted into the through-hole 41 of the supporting plate 4, to be rotatably supported thereby. The small diameter part 53 of the screw shaft 5 pierces the through-hole 41, and protrudes outwardly therefrom, to be inserted in and surrounded by the folded-back end 22 of the part bent sideways of the clamping wire 2, thereby anchoring and restraining the wire end 22.

At the other end of the screw spindle shaft 5, a rotational driving means 52, such as a flat plate moved by the fingers of a human hand or square head or a head with a + or − groove, etc., which may be engaged by such a tool as a spanner, driver, or the like instruments, is provided. Due to one of these means, the screw spindle shaft 5 is rotated so that the holding plate 3 may be directed toward or separated from the supporting plate 4, while holding the folded-back end 21 of the clamping wire 2 anchored thereto, thus releasing or tightening the clamping wire 2.

After putting the clamping wire 2 on the part of the hose 6 to be clamped, the clamping wire 2 is tightened by separating the holding plate 3 from the supporting plate 4 by rotationally driving the screw shaft 5. Then, as the holding or pressing plate 3 keeps the folded-back end 21 of the clamping wire 2 anchored thereto, it is tilted to the left as shown by the broken line in FIG. 2 due to the balance of force, thereby not only stabilizing the clamping, with the pressing part 33 of the holding piece 32 pressing the hose 6, working as the fulcrum, but strongly drawing the folded-back end 21 of the clamping wire 2 due to the leverage. In that way, a powerful clamping of the hose 6 is realized.

The fastener of this invention is composed of only four parts, — the clamping wire 2, holding or pressing plate 3, supporting plate 4 and screw spindle shaft 5.

Thus, the reduced number of parts used contributes to a simplified assembling and disassembling of the device. Furthermore, each part, having a single shape, is amenable to automated manufacturing, and so quantity production at low cost would be possible.

The holding or pressing plate 3 draws the clamping wire 2, while touching on the hose due to the pressing part 33 at its lower end, thereby not only stabilizing the clamping due to the balance of force, but producing a strong clamping by the leverage. Thus, excellent effects may be achieved by the use of the fastener device of the present invention.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fastener comprising:
   a. a clamping wire comprised of a spring wire wound in a ring shape, with the ends intersecting each other and projected upward;
   b. a supporting plate with a through-hole, in contacting relation with one end of the clamping wire;
   c. a holding plate having a vertical element with the lower end thereof bent and extended upward, the vertical element having a screw hole at the center of the upper portion thereof, and adapted to hold the other end of the clamping wire in an anchored fashion thereto;
   d. a screw shaft threaded through the screw hole of the holding plate, with one end thereof being stayed by the supporting plate, rotationally supported in the aforementioned through-hole, and being provided with a rotational driving means at the other end; and
   e. wherein a slit is located in the lower portion of the holding plate, and the folded-back end of the clamping wire is inserted into said slit, to be anchored to the vertical piece.

2. The fastener set forth in claim 1, wherein the folded-back end of the clamping wire is inserted in an anchoring hole vertically displaced from the screw hole of the vertical piece, to be anchored thereto.

3. The fastener set forth in claim 1, wherein the rotational driving means of the screw shaft is a flat plate.

4. The fastener set forth in claim 1, wherein the rotational driving means of the screw shaft has a square head.

5. The fastener set forth in claim 1, wherein the rotational driving means of the screw shaft has a head provided with a + groove.

6. The fastener set forth in claim 1, wherein the rotational driving means of the screw shaft has a head provided with a − groove.

* * * * *